United States Patent [19]

Bruneval

[11] Patent Number: 4,965,411
[45] Date of Patent: Oct. 23, 1990

[54] SPLICE FOR JOINING THE ARMORING OF TWO WIRE-ARMORED CABLES, AND A METHOD OF MAKING THE SPLICE

[75] Inventor: Gilles Bruneval, Loon Plage, France

[73] Assignee: Societe Anonyme dite : Les Cables de Lyon, Clichy Cedex, France

[21] Appl. No.: 369,409

[22] Filed: Jun. 21, 1989

[30] Foreign Application Priority Data

Jun. 24, 1988 [FR] France .................................. 88 08507

[51] Int. Cl.⁵ ......................................... H02G 15/103
[52] U.S. Cl. ........................................ 174/89; 156/49; 174/88 C
[58] Field of Search .................. 174/89, 88 C; 156/49

[56] References Cited

U.S. PATENT DOCUMENTS 3,450,829  6/1969  Paul ........................................ 174/89

FOREIGN PATENT DOCUMENTS

| | | |
|---|---|---|
| 438288 | 12/1926 | Fed. Rep. of Germany . |
| 837131 | 3/1952 | Fed. Rep. of Germany ........ 174/89 |
| 726054 | 5/1932 | France ............................. 174/89 |
| 61301 | 4/1968 | German Democratic Rep. ... 174/89 |
| WO8704573 | 7/1987 | PCT Int'l Appl. . |
| 196511 | 4/1923 | United Kingdom . |
| 851508 | 10/1960 | United Kingdom .................. 174/89 |
| 2149981 | 6/1985 | United Kingdom . |

*Primary Examiner*—Morris H. Nimmo
*Attorney, Agent, or Firm*—Sughrue, Mion, Zinn, Macpeak & Seas

[57] ABSTRACT

A splice for joining the armoring of two wire-armored cables (1, 2). The armoring is clamped between conical parts (5, 9; 6, 10) at each cable end. Each inner conical part (5, 6) is integral with a flange (7, 8) bolted to one of two similar flanges (13, 14) fixed to opposite ends of a generally tubular flexible assembly itself constituted by three layers of metal wires. The innermost first layer (22) is wound helically. The other two layers (19, 20) are wound with substantially equal and opposite pitches. The inside diameters of the first layer and of the circular openings in each of the two flanges (13, 14) fixed thereto are such that the flexible assembly is capable of sliding at one of its ends over at least one of the cables to be connected after its armoring layers have been removed, and at its other end over the splice (21) between the cables themselves. The invention also provides a method of making the splice.

6 Claims, 3 Drawing Sheets

SPLICE FOR JOINING THE ARMORING OF TWO WIRE-ARMORED CABLES, AND A METHOD OF MAKING THE SPLICE

The present invention relates to a splice for joining the armoring of two wire-armored cables, the armoring being clamped between conical parts at each cable end on each side of the splice, and more particularly it relates to a splice for interconnecting the armoring constituted by layers of wires as provided on certain power or telecommunications cables. This splice for joining the armoring is normally the outer portion of a system for interconnecting two cables, with the inner portion being constituted by a splice for interconnecting the cables themselves. The invention also extends to a method of making the armoring splice.

BACKGROUND OF THE INVENTION

The term "cable" is used below to designate a set of electrical and/or optical conductors contained in an outer covering. The wire armoring is constituted by one or more layers of wires generally made of metal and wound helically around the cable. The cables to which the invention applies are thus wire-armored cables.

This type of cable covered in wire armoring is widely used when the cable needs to withstand large traction forces without being damaged, and needs to withstand making contact with objects which are sharp or abrasive. A typical example is constituted by under-sea cables laid in waters of medium depth, in particular close to the shore, which cables must be capable of withstanding forces from anchors and from fishing tackle, and which must also be able to withstand the traction exerted by their own weight between a cable-laying ship and the sea bottom.

In general, the splice between two cables provided with armoring is frequently made on board a cable-laying ship, using the following technique which is well known to the person skilled in the art. After reconstituting electrical and/or optical continuity of the electrical and/or optical conductors contained in the core of the cables, and after reconstituting the outer protective covering by taping or by molding on thermoplastic material, or by soldering on a lead sleeve, the armoring wires from each cable end on either side of the splice are rewound by hand around the splice so that the wires of one end are interposed between the wires from the other end in the vicinity of the splice and overlie one another over a certain distance on either side of the splice, with the assembly being held together by one or more auxiliary wires wound with contiguous turns in each of the two zones containing armoring wires of one cable end overlapping the wires of the other cable end.

Reconstituting the armoring around a splice using this method takes a long time, is difficult to do, and does not guarantee that the zone containing the splice in the connected cable is capable of withstanding as large a traction force as the cable can withstand outside the splice zone. When a spliced cable is subjected to traction, the wires of one of the ends may slide between or over the wires of the other end.

In order to solve this problem, French patent document FR-A No. 2 537 357 in the same of LES CABLES DE LYON proposes connecting each wire on one of the ends to a corresponding wire on the other end by means of a sleeve tapped at each end with oppositely-handed threads. This prevents the wires on one end sliding relative to those on the other, but the traction strength at the sleeves nevertheless remains weaker than in uninterrupted cable since the threading operation reduces the cross-section of each wire.

The object of the present invention is to obtain mechanical performance in the splice zone of a spliced cable which is no worse than the mechanical performance away from the slice, and which corresponds to the composition and the dimensions of the, or each, layer of wire armoring provided on the cable. The same splice can be used for interconnecting the armoring of two cables having different structures of armoring, e.g. different numbers of layers, or different dimensions, e.g. in layer diameter, or in number of wires, or in wire diameter.

SUMMARY OF THE INVENTION

In the splice of the invention each inner conical part is integral with a flange bolted to one of two similar flanges fixed to opposite ends of a generally tubular flexible assembly itself constituted by three layers of metal wires, preferably steel wires, with the innermost first layer being wound helically with contiguous turns, and with the other two layers being wound over the first layer at substantially equal pitches but in opposite directions to each other, the inside diameters of the first layer and of the circular openings in each of the two flanges fixed thereto being such that said flexible assembly is capable of sliding at one of its ends over at least one of the cables to be connected after its armoring layers have been removed, and at its other end over the splice between the cables themselves.

The splice of the invention makes it possible to reduce splicing time considerably on board the cable-laying ship, since the flexible assembly and the conical parts are factory made. In addition, the splice can easily have mechanical performance which is as good as that of the lengths of armoring it interconnects. This can be achieved merely by selecting the number and diameter for the wires constituting the splice appropriately. As already mentioned, the splice can be used for interconnecting two very different types of armoring. Finally, although flexible, its bending strength can easily be made equal to or even greater than the bending strength of the cables themselves. Thus, during laying, the spliced cable is prevented from taking up a radius of curvature in the splice zone which is less than the minimum radius which the splice between the cables themselves can withstand without damage.

BRIEF DESCRIPTION OF THE DRAWINGS

An embodiment of the invention is described by way of example with reference to the accompanying drawings, in which.

DETAILED DESCRIPTION

Figure 1:
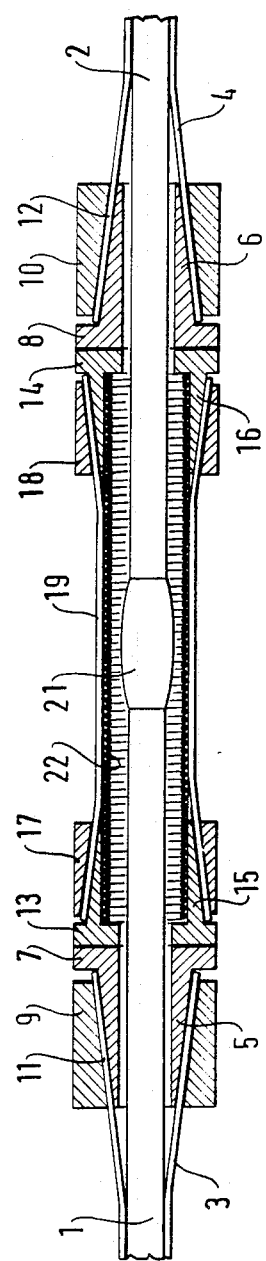
FIG. 1 is an overall diagram of an armoring splice in accordance with the invention.
Figure 2:
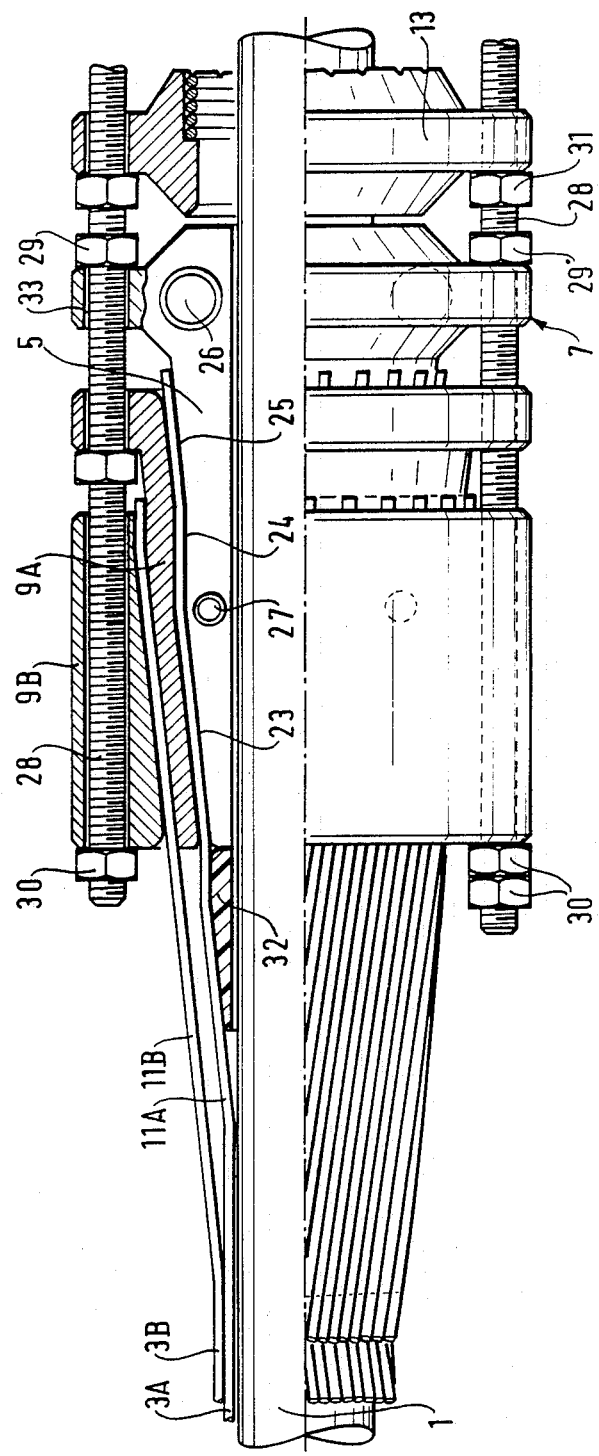
FIG. 2 is an elevation view in half axial section showing a detail of the fixing for the armoring of the cable end shown to the left of FIG. 1.
Figure 3:
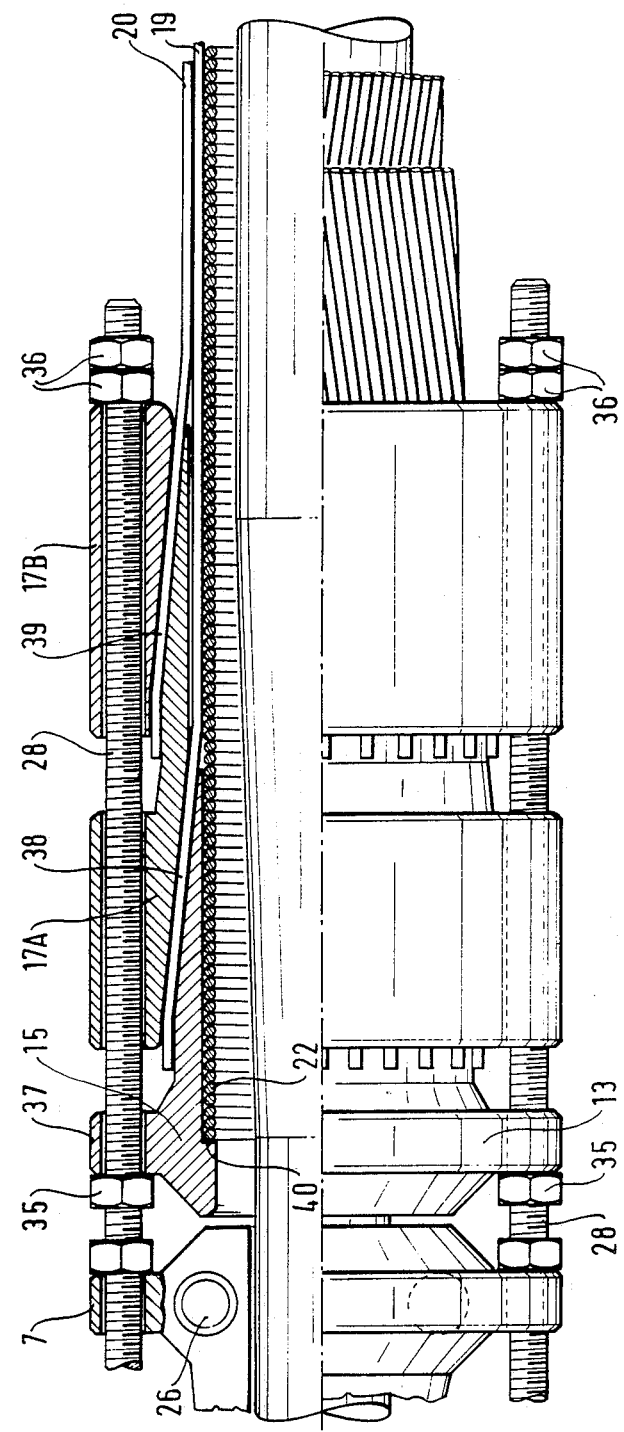
FIG. 3 is a detail view in elevation and in half axial section through the flexible assembly which interconnects the armor fixings at the two cable ends.

FIG. 1 shows the ends 1 and 2 of two cables delimited by their outer coverings. The electrical and/or optical conductors, and the outer coverings are interconnected within splice 21 using conventional techniques. The two cables are protected by one layer (or more frequently by two layers) of armoring wires whose ends 11 and 12 are clamped between conical parts 5 and 9 for the cable 1 and between conical parts 6 and 10 for the cable 2 (which conical parts 9 and 10 may be doubled-up, as shown in FIGS. 2 and 3). In FIG. 1, only one layer of armoring 3 or 4 is shown, in order to simplify the figure. The male conical parts 5 and 6 are integral with flanges 7 and 8 which are fixed to flanges 13 and 14 constituting the ends of the flexible assembly for splicing the armoring 3 and 4 of cables 1 and 2. This flexible assembly comprises a winding 22 of contiguous turns of steel wire having two layers of steel wires helically wound thereover (and represented in this figure by a single layer 19). The two layers are wound with oppositely-handed pitches. The ends of the layer 22 are threaded inside bores in male conical parts 15 and 16 which are integral with the flanges 13 and 14. The layers of steel wires 19 are clamped between concentric conical parts 15 and 17 at one end, and between concentric conical parts 16 and 18 at the other end.

The layers 19 withstand the traction forces applied between the armoring 3 and 4 of cables 1 and 2. The winding 22 withstands transverse forces generated by the layers 19 being put under tension and thus prevents them from crushing the splice 21.

FIG. 2 shows the detail of the fixing between the layers of armoring wires 3A and 3B and the conical parts 5, 9A, and 9B. The part 5 is in the form of a shell delimited by a cylindrical central bore and by an outer conical surface. Its larger diameter end is integral with a circular flange pierced around its periphery by holes 33 for receiving threaded rods 28. In order to facilitate installation around cable 1, the shell 5 is split into two identical parts about a diametrical plane which is also the plane of the half-section in the figure. The two half-shells are fixed to each other by at least two pegs 26 level with the flange 7 and two smaller-diameter pegs 27 in the conical portion. The end 11A of the first layer of armoring is clamped between the conical surface of the shell 5 and a conical inside surface of shell 9A. The end 11B of the second layer of armoring is clamped between the conical outer surface of shell 9A and a conical inner surface of shell 9B. The flared end of shell 9A includes a circular flange pierced by holes through which the threaded rods 28 pass. Similarly, the shell 9B is pierced by holes.

The flange 7 and the shell 9B are clamped towards each other between nuts 29 and nuts together with lock nuts 30 screwed onto the threaded rods 28, which rods also project beyond the flange 7 in order to enable it to be fixed to the flange 13 and thus to the flexible armor-splicing assembly. In order to improve the wedging effect applied to the layer of armoring 3A between the parts 5 and 9A, the generator lines of the outer surface of the shell 5 and of the inner surface of the shell 9A are not rectilinear, but are constituted by two rectilinear segments 23 and 25 both sloping relative to the axis of the cable and interconnected by respective rectilinear segments 24 running parallel to the axis of the cable. The same shape may be given to the facing surfaces of the shells 9A and 9B. At the end of the shell 5, a conical sleeve 32 made of plastic material prevents the wires of the layer 3A from forming a sharp angle which could damage the covering of the cable.

FIG. 3 shows the detail of one end of the flexible armor-splicing assembly. It shows the winding 22 of contiguous turns of a steel wire and the two layers 19 and 20 helically wound around the layer 22. The ends 38 and 39 of the layers 19 and 20 are clamped between conical parts 15, 17A, and 17B, which are similar in structure to above-described conical parts 5, 9A, and 9B. The larger-diameter end of shell 15 is integral with flange 13 which is pierced around its periphery with holes 37 for passing the threaded rods 28 which interconnect flanges 7 and 13. Nuts 35 and nut-and-locknut pairs 36 serve to clamp the ends 38 and 39 of layers 19 and 20 in the cones of parts 15, 17A, and 17B. Unlike the shell 5, shell 15 is made as a single piece. The winding of contiguous turns 22 is received in the cylindrical bore of the part 15. It comes into abutment against a shoulder 40.

When making a splice, the shells 9B and 17B are threaded over the ends 1 and 2 of the cables prior to splicing together the cables at 21. Thereafter, the layers 11B and 39 are unwound over a certain distance. The shells 9A and 10A are then threaded over the layers 11A and 12A and the layers 11A and 38 are unwound over a certain distance. Finally, the flexible armor-splicing assembly is threaded over one of the cable ends, e.g. the end 1 for which the length of armor unwinding has been determined appropriately. With splicing work thus prepared, the splice 21 can be made, after which the armor fixing can be installed at cable end 2 opposite to the end on which the flexible splice assembly is waiting. Finally, the flexible assembly can be slid over the splice 21 and bolted to the armor fixing on end 2. Splicing is terminated by mounting the armor fixing on end 1 and then fixing it to the flexible assembly. The shells 5 and 6 are made in two pieces so as to facilitate this final operation by avoiding the need for them to be prior threaded over the cables. Finally, the bore through at least one of the flanges 13 and 14 (depending on which end the flexible assembly is initially threaded over), must be large enough to enable the flexible assembly to slide over the splice 21, whereas the bore through the other one of these flanges need only be marginally greater than the diameter of the coverings on the cables.

I claim:

1. A splice comprising: two wire-armored cables each having an internal conductor and exterior armoring, and a cable end, the armoring being clamped between concentric, radially inner and outer conical parts at each cable end on each side of the splice, each inner conical part being integral with a flange bolted to one of two similar flanges fixed to opposite ends of a generally tubular flexible assembly, said flexible assembly being constituted by three layers of metal wires comprising a radially innermost first layer wound helically with contiguous turns, and two other radial layers wound successively over the first layer at substantially equal pitches but in opposite directions to each other, each of said flanges having a circular opening therein, the inside diameters of the first layer and of the circular openings in each of two flanges fixed to said first layer being such that said flexible assembly is capable of sliding at one of its ends over at least one of the cables to be connected after its armoring layers have been removed, and at its other end over a splice between said cable conductors.

2. A splice according to claim 1, wherein the flexible assembly is sufficiently flexible to be bent to a smaller radius of curvature than that to which the cables can be bent.

3. A splice according to claim 2, wherein the cross-sections of the other two layers of armoring are such that the elastic elongation thereof is considerably less than the elastic elongation of the cable armoring.

4. A splice according to claim 1, wherein the cross-sections of the other two layers of armoring are such that the elastic elongation thereof is considerably less than the elastic elongation of the cable armoring.

5. A splice according to claim 1, wherein the three layers of metal wires are made of steel.

6. A method of making a splice joining the armoring of two wire-armored cables, comprising the steps of: clamping the armoring between concentric, radially inner and outer conical parts at each cable end of the wire-armored cable on each side of the splice, each inner conical part being integral with a flange, bolting the flange of each inner conical part to a respective one of two similar flanges fixed to opposite ends of a generally tubular flexible assembly, forming said tubular flexible assembly of three concentric layers of metal wires by winding an innermost first layer helically with contiguous turns, and winding successively over the first layer at substantially equal pitches, two other layers in opposite directions to each other, forming the inside diameters of said first layer and of circular openings in each of the two flanges fixed thereto such that said flexible assembly is capable of sliding at one of its ends over at least one of the cables to be connected after removing its armoring layer, and at the other end over a splice formed between the conductors of said cables internally of said armoring, threading the outer conical parts over the cable ends after at least one layer of armoring wires are removed therefrom over a certain axial distance thereof, threading the flexible tubular assembly over one of the cable ends, splicing the conductors of the cables together at said cable end, threading the flexible tubular assembly over the other cable end, sliding said flexible assembly over the splice between conductors of respective cables at said cable ends, and bolting of said flexible assembly to the armoring of said one end, and to the armoring of said other end of the two wire-armored cables.

* * * * *